(12) United States Patent  
Kittleson

(10) Patent No.: US 9,926,796 B2
(45) Date of Patent: Mar. 27, 2018

(54) PLY, METHOD FOR MANUFACTURING PLY, AND METHOD FOR MANUFACTURING ARTICLE WITH PLY

(71) Applicant: GENERAL ELECTRIC COMPANY, Schenectady, NY (US)

(72) Inventor: Jacob John Kittleson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 274 days.

(21) Appl. No.: 14/811,351

(22) Filed: Jul. 28, 2015

(65) Prior Publication Data

US 2017/0030207 A1    Feb. 2, 2017

(51) Int. Cl.
*F01D 9/04* (2006.01)
*F01D 25/28* (2006.01)
(Continued)

(52) U.S. Cl.
CPC ............ *F01D 9/041* (2013.01); *B32B 18/00* (2013.01); *B33Y 80/00* (2014.12); *C04B 37/00* (2013.01); *F01D 5/147* (2013.01); *F01D 5/187* (2013.01); *F01D 5/282* (2013.01); *F01D 5/284* (2013.01); *F01D 9/065* (2013.01); *F01D 25/28* (2013.01); *F23R 3/002* (2013.01); *B33Y 10/00* (2014.12); *C04B 2235/526* (2013.01); *C04B 2235/5268* (2013.01); *C04B 2235/6026* (2013.01);
(Continued)

(58) Field of Classification Search
CPC .......... F01D 9/041; F01D 5/282; F01D 25/28; F01D 5/147; F01D 5/187; F01D 5/284; F01D 9/065; F23R 3/002; B33Y 80/00; B33Y 10/00; B33Y 70/00; B29C 67/0055; B29C 67/0085; B32B 18/00
See application file for complete search history.

(56) References Cited

U.S. PATENT DOCUMENTS 9,126,365 B1 * 9/2015 Mark ..................... B29C 70/20
2014/0134335 A1   5/2014 Pridoehl et al.
(Continued)

FOREIGN PATENT DOCUMENTS

WO    2014/209994 A2    12/2014
WO    2016/085654 A1    6/2016

OTHER PUBLICATIONS

Combined Search and Examination Report issued in connection with corresponding GB Application No. 1612499.2 dated Dec. 19, 2016.

*Primary Examiner* — Mathieu Vargot
(74) *Attorney, Agent, or Firm* — McNees Wallace & Nurick LLC

(57) ABSTRACT

A method for manufacturing a ply is disclosed. The method includes printing the ply, the ply including a near net shape and a ceramic matrix composite nonwoven material. A ply is disclosed wherein the near net shape is a predetermined layer of an article. A method for manufacturing an article is also disclosed. The method includes printing a first ply and a second ply. The first ply includes a first near net shape and a first ceramic matrix composite nonwoven material, and the second ply includes a second near net shape and a second ceramic matrix composite nonwoven material. The method further includes applying the second ply to the first ply, and consolidating the first ply and the second ply.

17 Claims, 4 Drawing Sheets

(51) Int. Cl.
  *B33Y 80/00* (2015.01)
  *F01D 5/28* (2006.01)
  *F23R 3/00* (2006.01)
  *C04B 37/00* (2006.01)
  *F01D 5/14* (2006.01)
  *F01D 5/18* (2006.01)
  *F01D 9/06* (2006.01)
  *B32B 18/00* (2006.01)
  *B33Y 10/00* (2015.01)

(52) U.S. Cl.
  CPC .. *C04B 2237/343* (2013.01); *C04B 2237/365* (2013.01); *C04B 2237/368* (2013.01); *C04B 2237/38* (2013.01); *F05D 2220/32* (2013.01); *F05D 2230/31* (2013.01); *F05D 2230/40* (2013.01); *F05D 2230/51* (2013.01); *F05D 2300/6033* (2013.01); *F05D 2300/613* (2013.01); *F05D 2300/614* (2013.01)

(56) References Cited

U.S. PATENT DOCUMENTS

| | | | |
|---|---|---|---|
| 2014/0193577 A1* | 7/2014 | Monaghan | F01D 5/282 427/248.1 |
| 2016/0009030 A1 | 1/2016 | Mark et al. | |
| 2016/0059437 A1 | 3/2016 | Lacy et al. | |
| 2016/0214283 A1 | 7/2016 | Schick et al. | |

* cited by examiner

PLY, METHOD FOR MANUFACTURING PLY, AND METHOD FOR MANUFACTURING ARTICLE WITH PLY

FIELD OF THE INVENTION

The present invention is directed to plies, methods for manufacturing plies, and methods for manufacturing articles from plies. More particularly, the present invention is directed to plies, methods for manufacturing plies, and methods for manufacturing articles from plies including a near net shape and a ceramic matrix composite nonwoven material.

BACKGROUND OF THE INVENTION

Gas turbines are continuously being modified to provide increased efficiency and performance. These modifications include the ability to operate at higher temperatures and under harsher conditions, which often requires material modifications and/or coatings to protect components from such temperatures and conditions. As more modifications are introduced, additional challenges are realized.

One modification to increase performance and efficiency involves forming gas turbine components, such as, but not limited to, shrouds, turbine struts, nozzles/vanes, combustion liners, buckets/blades, shroud rings, exhaust ducts, augmentation liners, and jet exhaust nozzles from a ceramic matrix composite (CMC). CMC gas turbine components may be formed from plies of CMC material. However, CMC material is expensive, and paring sheets of CMC material to a required shape for a ply results in the production of significant amounts of CMC scrap. In addition, the paring process may introduce defects into the ply, and may require multiple paring steps to achieve a sufficiently precise conformation.

BRIEF DESCRIPTION OF THE INVENTION

In one exemplary embodiment, a method for manufacturing a ply includes printing the ply, the ply including a near net shape and a ceramic matrix composite nonwoven material.

In another exemplary embodiment, a method for manufacturing an article includes printing a first ply and a second ply. The first ply includes a first near net shape and a first ceramic matrix composite nonwoven material, and the second ply includes a second near net shape and a second ceramic matrix composite nonwoven material. The method further includes applying the second ply to the first ply, and consolidating the first ply and the second ply.

In another exemplary embodiment, a ply includes a near net shape and a ceramic matrix composite nonwoven material, wherein the near net shape is a predetermined layer of an article.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary plies, methods for manufacturing plies, and methods for manufacturing articles from plies. Embodiments of the present disclosure, in comparison to methods and products not utilizing one or more features disclosed herein, provide more cost effective and time-efficient methods for manufacturing plies and articles formed from plies and provide directionalization capability for non-woven fiber to follow at any point a predetermined fiber routing path within the ply.

Figure 1:
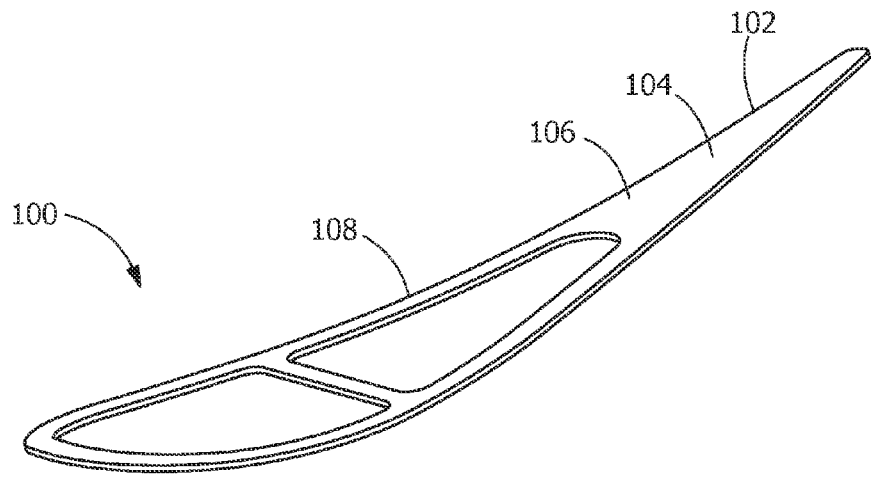
FIG. 1 is a perspective view of a ply, according to an embodiment of the present disclosure.

Referring to FIG. 1, a ply 100, includes a near net shape 102 and a ceramic matrix composite (CMC) nonwoven material 104. The near net shape 102 is a predetermined layer 108 of an article. The predetermined layer 108 may be any suitable topological construct, including, but not limited to, a cross-sectional layer of an article, a curved layer of an article, an angled layer of an article, or a combination thereof, wherein the predetermined layer 108 is adapted to constitute a portion of a larger article.

The ceramic matrix composite nonwoven material 104 may be any suitable material, including, but not limited to a unidirectional tape 106, a tape including randomly aligned fibers, a tape including non-continuous fibers, a tape including circular fibers, or a combination thereof. In one embodiment, the non-continuous fibers include any suitable fiber length, including, but not limited to, a fiber length of less than about 0.15 inches, alternatively less than about 0.1 inches, alternatively less than about 0.05 inches, alternatively about 0.01 inches to about 0.15 inches, alternatively about 0.02 inches to about 0.12 inches, alternatively about 0.05 inches to about 0.1 inches. In another embodiment, orientation of fibers relative to one another in the unidirectional tape 106 can vary. In a further embodiment, the orientation of fibers relative to one another in the unidirectional tape 106 vary by about 90°. Examples of CMCs include, but are not limited to, SiC, SiN, alumina, oxide-based composite ceramics and combinations thereof.

A method for manufacturing a ply 100 includes printing the ply 100. In one embodiment, the ply 100, as printed and without further modification, includes the near net shape 102. Printing the ply 100 may include extruding a coated pre-impregnated tow 300 (shown in FIG. 3) by a continuous filament fabrication process. In a further embodiment, the continuous fibers include any suitable fiber length, including, but not limited to, a fiber length of at least about 0.05 inches, alternatively at least about 0.1 inches, alternatively at least about 0.15 inches, alternatively about 0.05 inches to about 0.5 inches, alternatively about 0.1 inches to about 0.3 inches, alternatively about 0.15 inches to about 0.25 inches.

Printing the ply 100 may further include the use of a three-dimensional continuous fiber placement printer 302 (shown in FIG. 3) to extrude the coated pre-impregnated tow 300 by the continuous filament fabrication process. In one embodiment, the pre-impregnated tow 300 is heated, partially curing the ply 100 as the ply 100 is extruded. In a further embodiment, a heater element is included in an extruder or a printing bed of the printer 302.

In one embodiment, the coated pre-impregnated tow 300 includes coated CMC fibers, CMC particles, and carbon particulates. The coated pre-impregnated tow 300 may further include solvents, resins, alcohols, or a mixture thereof. The CMC particles may be submicron-sized particles. In a further embodiment, the CMC particles include a largest dimension of no more than about 1 micron, alternatively no more than about 10 microns, alternatively no more than about 20 microns. The carbon particulates may include, but are not limited to, elemental carbon, a hydrocarbon, any organic material containing carbon, or a combination thereof. Elemental carbon may be present in one or more forms.

Figure 2:
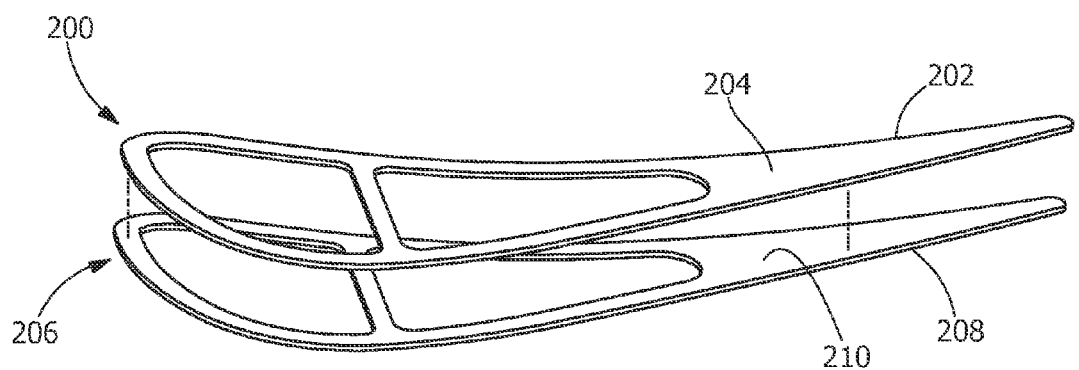
FIG. 2 is a perspective view of a first ply and a second ply, according to an embodiment of the present disclosure.

Referring to FIG. 2, in one embodiment, a method for manufacturing an article includes printing a first ply 200 and a second ply 206. The first ply 200 includes a first near net shape 202 and a first CMC nonwoven material 204. The first ply 200 may be printed by extruding the coated pre-impregnated tow 300 directly onto a substrate or by printing the ply free of a substrate. The first ply 200 may be transferred mechanically or manually to a substrate for further processing. The substrate may be any suitable object, including, but not limited to, an article surface, an intermediate surface, a tooling surface, a turbine component surface, or a combination thereof. The second ply 206 includes a second near net shape 208 and a second CMC nonwoven material 210, wherein the first near net shape 202 and the second near net shape 208 are adjacent predetermined layers 108 of an article. The method further includes applying the second ply 206 to the first ply 200, and consolidating the first ply 200 and the second ply 206. Any number of plies 100 may be applied by this method. Consolidating the first ply 200 and the second ply 206 (and any additional plies 100) may include any suitable technique, including, but not limited to, autoclaving, burning out, local heat treatment, inductive heating, or combinations thereof.

In one embodiment, the method for manufacturing also includes densifying the first ply 200 and the second ply 206. Densifying may include any suitable technique, including, but not limited to, melt infiltration or vapor deposition. Vapor deposition may include deposition of pure silicon, any suitable oxide, including, but not limited to, silicon oxide, or a combination thereof. Melt infiltration may include, but is not limited to, melting silicon into the first ply 200 and the second ply 206, and reacting the silicon with carbon particulates to form silicon carbide, thus consolidating the first ply 200 and the second ply 206.

The second ply 206 may be printed by extruding the coated pre-impregnated tow 300 directly onto a substrate or by printing the ply free of a substrate. In one embodiment, the second ply 206 is transferred manually or mechanically to a substrate for further processing. In another embodiment, the second ply 206 is transferred manually or mechanically to the first ply 200, which is located on a substrate for further processing.

Figure 3:
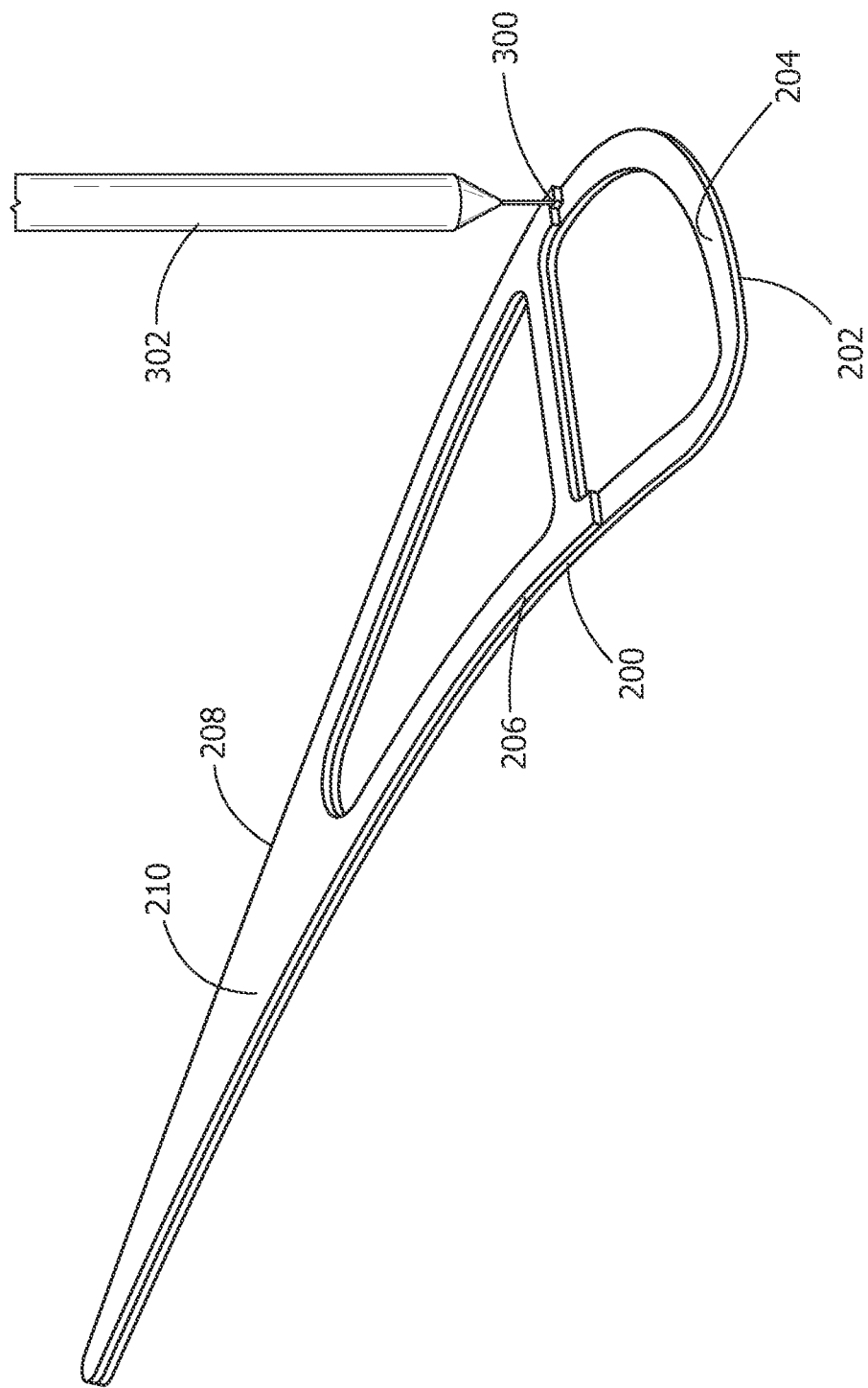
FIG. 3 is a perspective view of a first ply and a second ply, wherein the second ply is in the process of being formed directly onto the first ply, according to an embodiment of the present disclosure.

Referring to FIG. 3, in another embodiment, printing the second ply 206 and applying the second ply 206 to the first ply 200 occurs simultaneously by extruding the coated pre-impregnated tow 300 directly onto the first ply 200. Simultaneous extrusion may include printing a portion of the first ply 200, and then extruding the coated pre-impregnated tow 300 directly onto the portion of the first ply 200 prior to form a commensurate portion of the second ply 206 and apply the commensurate portion of the second ply 206 simultaneously. In a further embodiment, extruding the coated pre-impregnated tow directly onto the first ply 200 includes the use of a three-dimensional continuous fiber placement printer 302.

Figure 4:
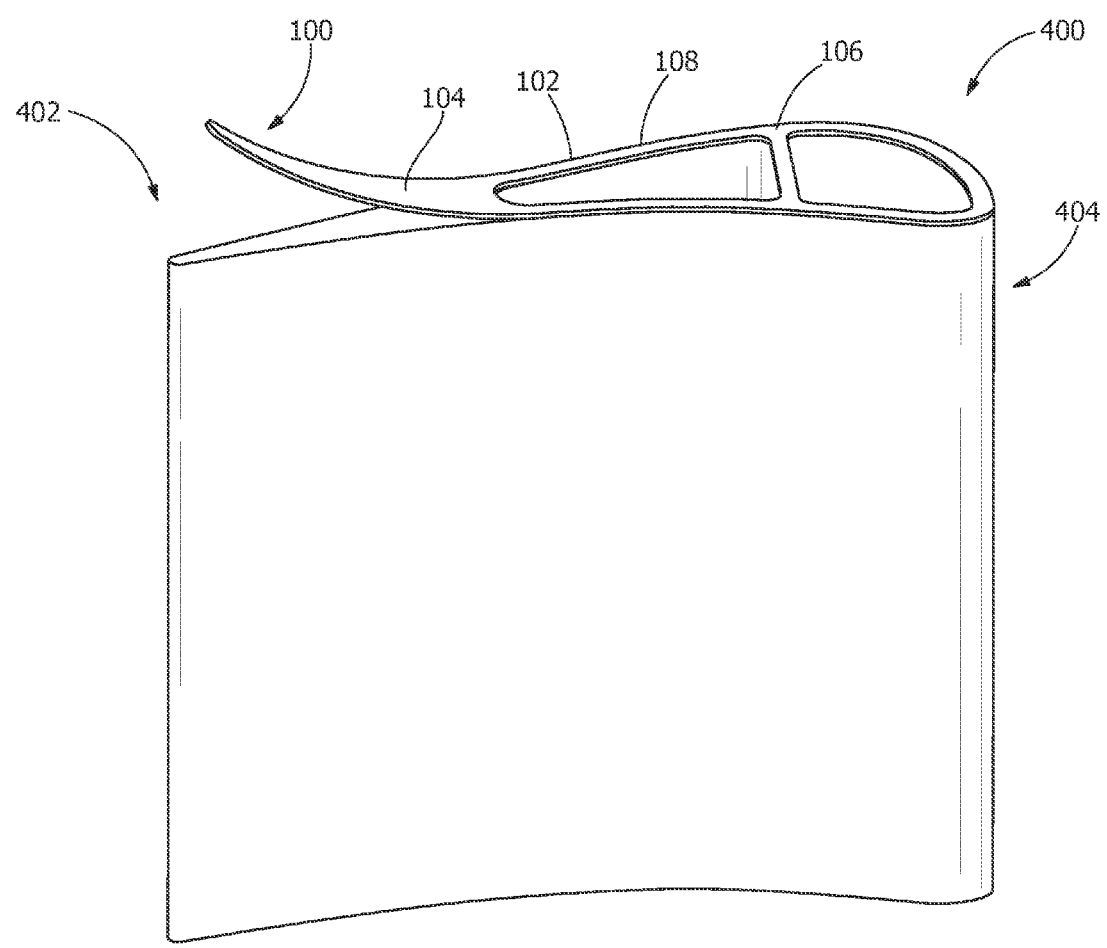
FIG. 4 is a perspective view of a ply being applied to form a turbine nozzle, according to an embodiment of the present disclosure.
Figure 5:
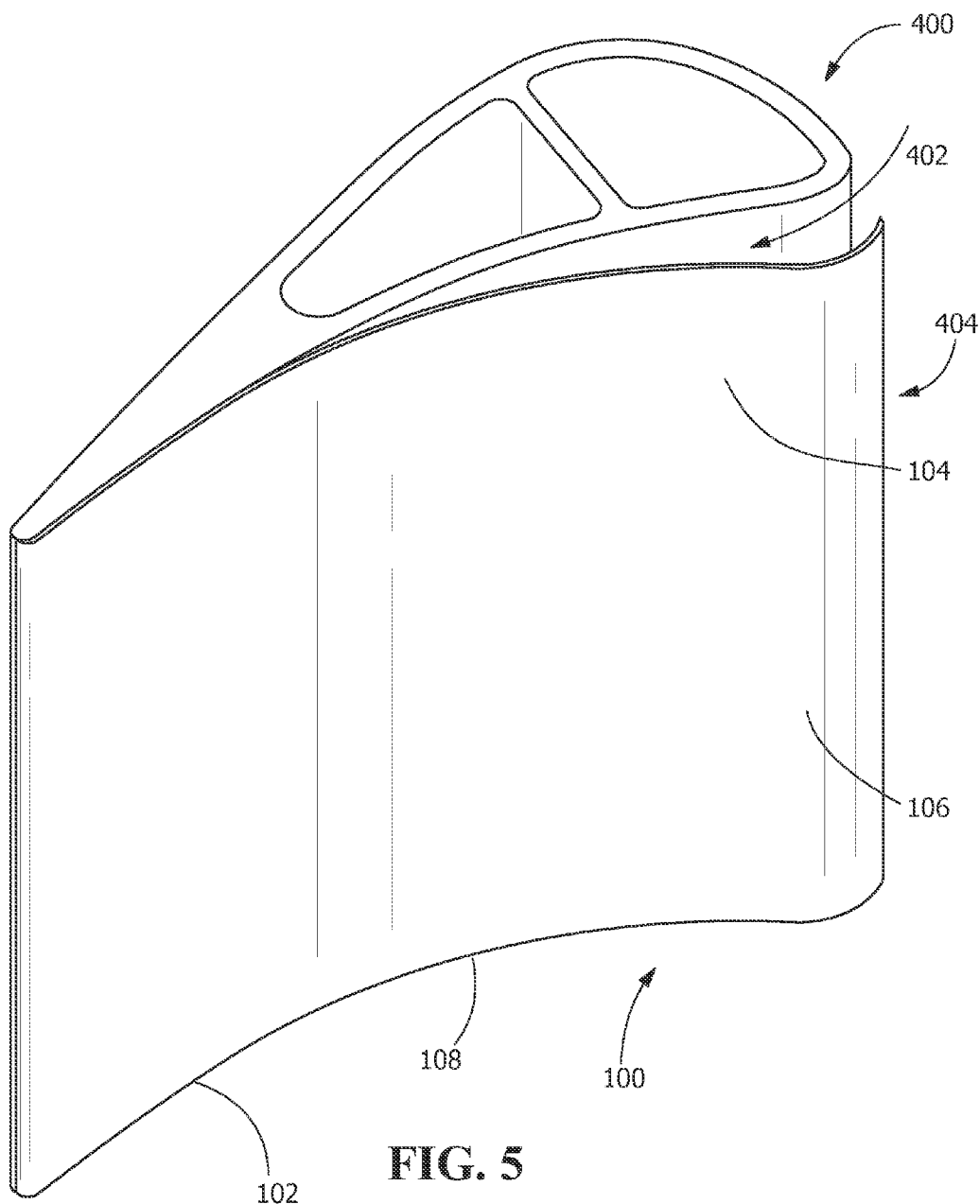
FIG. 5 is a perspective view of a ply being applied to form a turbine nozzle, according to an embodiment of the present disclosure.

Referring to FIGS. 4 and 5, the near net shape 102 is a predetermined layer 108 of a turbine component 400. The turbine component may be any suitable component, including but not limited to, a shroud, a turbine strut, an airfoil 402, a nozzle 404 (vane), a combustion liner, a bucket (blade), a shroud ring, an exhaust duct, an augmentation liner, a jet exhaust nozzle, or a combination thereof. In one embodiment (FIG. 4), the ply 100 is a predetermined layer 108 having a cross-sectional topology, and in another embodiment (FIG. 5), the ply 100 is a predetermined layer 108 having a curved topology.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for manufacturing a ply, comprising:
  printing the ply, the ply including a near net shape and a ceramic matrix composite nonwoven material,
  wherein printing the ply includes:
    extruding a coated pre-impregnated tow by a continuous filament fabrication process onto a printing bed of a printer, the coated pre- impregnated tow including:
      ceramic matrix composite fibers;
      ceramic matrix composite particles;
      carbon particulates; and
      a material selected from the group consisting of solvents, resins, alcohols, and combinations thereof; and
    heating the coated pre-impregnated tow while extruding the coated pre-impregnated tow by heating the printing bed onto which the coated pre-impregnated tow is extruded, the heating the coated pre-impregnated tow partially curing the coated pre-impregnated tow.

2. The method of claim 1, wherein printing includes the use of a three-dimensional continuous fiber placement printer.

3. The method of claim 1, wherein the nonwoven material is a unidirectional tape.

4. The method of claim 3, wherein the near net shape is a predetermined layer of a turbine component.

5. The method of claim 4, wherein the turbine component is an airfoil.

6. The method of claim 5, wherein the turbine component is a nozzle.

7. A method for manufacturing an article, comprising:
  printing a first ply, the first ply including a first near net shape and a first ceramic matrix composite nonwoven material;
  printing a second ply, the second ply including a second near net shape and a second ceramic matrix composite nonwoven material;

applying the second ply to the first ply, applying the second ply to the first ply including transferring the second ply manually or mechanically to the first ply; and consolidating the first ply and the second ply, wherein printing the first ply and printing the second ply include:
- extruding a coated pre-impregnated tow by a continuous filament fabrication process onto a printing bed of a printer, the coated pre-impregnated tow including:
  - ceramic matrix composite fibers;
  - ceramic matrix composite particles;
  - carbon particulates; and
  - a material selected from the group consisting of solvents, resins, alcohols, and combinations thereof; and
- heating the coated pre-impregnated tow while extruding the coated pre-impregnated tow by heating the printing bed onto which the coated pre-impregnated tow is extruded, the heating the coated pre-impregnated tow partially curing the coated pre-impregnated tow.

8. The method of claim 7, wherein printing the first ply and printing the second ply includes the use of a three-dimensional continuous fiber placement printer.

9. The method of claim 7, wherein the first near net shape and the second near net shape are adjacent predetermined layers of an article.

10. The method of claim 9, wherein the article is a turbine component.

11. The method of claim 10, wherein the turbine component is an airfoil.

12. The method of claim 11, wherein the turbine component is a nozzle.

13. The method of claim 7, wherein consolidating the first ply and the second ply includes a technique selected from the group consisting of autoclaving, burning out, local heat treatment, inductive heating, and combinations thereof.

14. The method of claim 1, wherein heating the coated pre-impregnated tow while extruding the coated pre-impregnated tow includes heating with a heater element disposed in the printing bed.

15. The method of claim 7, wherein heating the coated pre-impregnated tow while extruding the coated pre-impregnated tow includes heating with a heater element disposed in the printing bed.

16. The method of claim 1, wherein the ceramic matrix composite particles include a largest dimension of no more than about 20 microns.

17. The method of claim 1, wherein the carbon particulates include elemental carbon.

* * * * *